United States Patent
Tang et al.

(10) Patent No.: US 9,362,834 B2
(45) Date of Patent: Jun. 7, 2016

(54) FLYBACK POWER SUPPLY CIRCUIT WITH PROGRAMMABLE FUNCTION AND CONTROL METHOD THEREOF

(71) Applicants: Chien-Fu Tang, Hsinchu (TW); Isaac Y. Chen, Zhubei (TW); Kuang-Fu Chang, Kaohsiung (TW); Hsin-Yi Wu, Taipei (TW); An-Tung Chen, Taipei (TW)

(72) Inventors: Chien-Fu Tang, Hsinchu (TW); Isaac Y. Chen, Zhubei (TW); Kuang-Fu Chang, Kaohsiung (TW); Hsin-Yi Wu, Taipei (TW); An-Tung Chen, Taipei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 14/739,894

(22) Filed: Jun. 15, 2015

(65) Prior Publication Data

US 2015/0372603 A1   Dec. 24, 2015

Related U.S. Application Data

(60) Provisional application No. 62/014,301, filed on Jun. 19, 2014.

(51) Int. Cl.
*H02M 1/32* (2007.01)
*H02M 3/335* (2006.01)
*H02H 7/122* (2006.01)
*H02M 1/00* (2006.01)

(52) U.S. Cl.
CPC ............ *H02M 3/33523* (2013.01); *H02M 1/32* (2013.01); *H02M 3/33515* (2013.01); *H02M 2001/0025* (2013.01)

(58) Field of Classification Search
CPC ....... H02H 7/12; H02H 7/1213; H02H 7/122; H02H 9/04; H02H 9/046; H02M 3/335; H02M 3/33515; H02M 1/32
USPC .......... 363/21.05, 21.07, 21.13, 21.15, 56.05, 363/56.11
See application file for complete search history.

(56) References Cited

U.S. PATENT DOCUMENTS

| 6,208,531 B1 * | 3/2001 | Vinciarelli | H01F 38/14 363/21.07 |
|---|---|---|---|
| 9,236,806 B2 * | 1/2016 | Yang | H02M 3/33523 |
| 2013/0170621 A1 * | 7/2013 | Saka | H02M 3/33523 378/104 |
| 2014/0192569 A1 * | 7/2014 | Espino | H02H 7/1213 363/50 |
| 2015/0326008 A1 * | 11/2015 | Baurle | H02H 7/10 361/87 |

* cited by examiner

*Primary Examiner* — Gary L Laxton
(74) *Attorney, Agent, or Firm* — Tung & Associates

(57) ABSTRACT

The present invention discloses a flyback power supply circuit with a programmable function and a control method thereof. The flyback power supply circuit includes: a transformer circuit, a power switch circuit, a primary side control circuit, an opto-coupler circuit, and a secondary side control circuit. The primary side control circuit determines whether an over voltage condition occurs, and further determines whether to generate an over voltage protection signal to turn OFF a power switch of the power switch circuit according to a rate of increase of a feedback signal and a control level, or according to the rate of increase of the feedback signal and a rate of change of a target control signal.

23 Claims, 9 Drawing Sheets

FLYBACK POWER SUPPLY CIRCUIT WITH PROGRAMMABLE FUNCTION AND CONTROL METHOD THEREOF

CROSS REFERENCE

The present invention claims priority to U.S. 62/014,301, filed on Jun. 19, 2014.

BACKGROUND OF THE INVENTION

1. Field of Invention

The present invention relates to a programmable flyback power supply circuit and a control method thereof; particularly, it relates to such programmable flyback power supply circuit and control method thereof with improved over voltage protection.

2. Description of Related Art

FIGS. 1A and 1B show schematic diagrams of a conventional programmable flyback power supply circuit 100 and signal waveforms thereof, respectively. The flyback power supply circuit 100 can be programmed to provide plural different output voltages at an output node OUT, i.e., the output voltage Vout is programmable, for example as shown by the levels Vtrgt1 and Vtrgt2 of the programmable output voltage Vout1 in FIG. 1B. Referring to FIG. 1A, a rectifier circuit 101 rectifies an alternating current (AC) voltage Vac to generate an input voltage Vin. The rectifier circuit 101 is for example a bridge rectifier circuit. A transformer circuit 102 of the flyback power supply circuit 100 receives the input voltage Vin, and converts it to the output voltage Vout. The flyback power supply circuit 100 includes the aforementioned transformer circuit 102, a power switch circuit 103, an opto-coupler circuit 104, a primary side control circuit 105, a current sense circuit 106, and a secondary side control circuit 107. The primary side control circuit 105 generates an operation signal GATE according to a current sense signal CS generated by the current sense circuit 106 and a target control signal COMP generated by the opto-coupler circuit 104, for operating a power switch of the power switch circuit 103 to convert the input voltage Vin to the output voltage Vout. The transformer circuit 102 includes a primary winding W1 and a secondary winding W2. The secondary winding W2 is electrically connected to a ground level GND, and the primary winding W1 is electrically connected to a reference level REF. The current sense circuit 106 generates the current sense signal CS according to a power switch current flowing through the power switch of the power switch circuit 103. The secondary side control circuit 107 adjusts the target control signal COMP according to a setting signal SET and the programmable output voltage Vout, to regulate the programmable output voltage Vout or to change a target level of the programmable output voltage Vout.

For example, referring to the upper diagram of FIG. 1B, which shows the signal waveforms of the target control signal COMP1 and the programmable output voltage Vout1 in a normal operation. When the flyback power supply circuit 100 changes the level of the programmable output voltage Vout1 at the output node OUT from the level Vtrgt1 to the level Vtrgt2 according to the setting signal SET, referring to FIG. 1A, the secondary side control circuit 107 receives the setting signal SET in a digital form by pins D+ and D−, and converts it to a setting operation signal SETOP at pins O1 and O2. The setting operation signal SETOP controls the switches S1 and S2 in the secondary side control circuit 107, to determine the resistance of a series circuit of resistors R1, R2, R3, and R4, so as to determine the target control signal COMP. When the setting signal SET indicates that the level of the output voltage Vout1 should be regulated to the level Vtrgt1, the target control signal COMP1 will be set to a maximum level MAX at an initial stage; and when the programmable output voltage Vout1 achieves the level Vtrgt1, the level of the target control signal COMP1 is decreased, and the level of the programmable output voltage Vout1 is regulated at the level Vtrgt1 by feedback control through the current sense signal CS and the target control signal COMP1.

Next, when the setting signal SET indicates that the level of the output voltage Vout1 should be changed from the level Vtrgt1 to the level Vtrgt2, the target control signal COMP1 will be set to the maximum level MAX again; and when the programmable output voltage Vout1 achieves the level Vtrgt2, the level of the target control signal COMP1 is decreased, and the level of the programmable output voltage Vout1 is regulated at the level Vtrgt2 by feedback control through the current sense signal CS and the target control signal COMP1. When there is a sudden drop of the programmable output voltage Vout1 for any reason such as a sudden heavy loading requirement, as shown by "glitch1" in the figure, the target control signal COMP1 will be set to the maximum level again, to increase the level of the programmable output voltage Vout1 to the level Vtrgt2 by feedback control. On the other hand, when there is a sudden increase of the programmable output voltage Vout1, as shown by "glitch2" in the figure, the target control signal COMP1 will be decreased, to decrease the level of the programmable output voltage Vout1 to the level Vtrgt2 by feedback control.

In the above description, the feedback control by the target control signal COMP1 is achieved by means of an opto-coupler device in the opto-coupler circuit 104. More specifically, when the programmable output voltage Vout1 is too high, for example higher than the level Vtrgt1 set by the setting signal SET, the current flowing through the opto-coupler device is controlled to be relatively higher, such that the target control signal COMP1 is relatively lower, whereby the operation signal GATE operates correspondingly to decrease the programmable output voltage Vout1. On the other hand, when the programmable output voltage Vout1 is too low, for example lower than the level Vtrgt1 set by the setting signal SET, the current flowing through the opto-coupler device is controlled to be relatively lower, such that the target control signal COMP1 is relatively higher, whereby the operation signal GATE operates correspondingly to decrease the programmable output voltage Vout1.

When an over voltage condition occurs, the prior art circuit operates as below. An over voltage condition may occur, for example, when the opto-coupler device of the opto-coupler circuit 104 is damaged to form an open circuit; the target control signal COMP2 will be maintained at the maximum level MAX, and the level of the programmable output voltage Vout2 will keep increasing. Referring to the lower diagram of FIG. 1B which shows signal waveforms of the target control signal COMP2 and the programmable output voltage Vout2, wherein an over voltage condition occurs when the programmable output voltage Vout2 is maintained at the level Vtrgt1 or when the level of the programmable output voltage Vout2 is being changed from the level Vtrgt1 to the level Vtrgt2. In the beginning, the circuit operates normally, so when the setting signal SET indicates that the level of the output voltage Vout2 should be regulated to the level Vtrgt1, the target control signal COMP2 is set to the maximum level MAX at the initial stage, and when the programmable output voltage Vout2 achieves the level Vtrgt1, the level of the target control signal COMP2 is decreased, and the level of the programmable output voltage Vout2 is regulated at the level Vtrgt1 by feedback control.

Thereafter, for example in the process of maintaining the level of the programmable output voltage Vout2 at the level Vtrgt1, or in the process of changing the level of the programmable output voltage Vout2 from the level Vtrgt1 to the level Vtrgt2, an over voltage condition occurs. The target control signal COMP2 is changed to and maintained at the maximum level MAX, so the programmable output voltage Vout2 keeps increasing, and even over the level Vtrgt2, which can be very dangerous.

In the prior art, the countermeasure is to count the period wherein the target control signal COMP2 is maintained at the maximum level MAX, and when the target control signal COMP2 is maintained at the maximum level MAX for a period longer than a predetermined over voltage time OVT, the primary control circuit 105 will force the target control signal COMP2 decreasing for a "hiccup time" period. After the hiccup time period, the primary control circuit 105 will change the target control signal COMP2 to the maximum level MAX, to increase the output voltage Vout2 again.

The aforementioned over voltage protection mechanism in the prior art can not adequately protect the circuitry; the circuitry is often still damaged because the programmable output voltage Vout keeps increasing in the over voltage time OVT and becomes too high. FIG. 2 shows a prior art programmable flyback power supply circuit 200, which proposes a solution to the aforementioned problem by providing a backup. As shown in FIG. 2, the flyback power supply circuit 200 is different from the flyback power supply circuit 100 in that, the flyback power supply circuit 200 includes an opto-coupler circuit 204 which has two opto-coupler devices 204a and 204b connected in parallel. A secondary side control circuit 207 is coupled to light emitter parts of the opto-coupler devices 204a and 204b, and the primary side control circuit 205 is connected to light receiver parts of the opto-coupler devices 204a and 204b. Therefore, when one of the opto-coupler devices 204a and 204b is damaged to form an open circuit, the other one can maintain the normal operation, so that the target control signal COMP can be correctly generated according to the setting signal SET and the programmable output voltage Vout.

Obviously, the prior art of FIG. 2 greatly increases the cost and the space of the circuitry, and it only provides a limited improvement over the prior art flyback power supply circuit of FIG. 1.

In view of the above, the present invention proposes a flyback power supply circuit with a programmable function and a control method thereof, which improves the over voltage protection mechanism.

SUMMARY OF THE INVENTION

From one perspective, the present invention provides a flyback power supply circuit with a programmable function, comprising: a transformer circuit, which includes: a primary winding, for receiving an input voltage; a secondary winding, for generating a programmable output voltage at an output node; and a tertiary winding, for generating a feedback signal related to the programmable output voltage according to the programmable output voltage; a power switch circuit, which is coupled to the primary winding, for operating a power switch therein according to an operation signal, so as to convert the input voltage to the programmable output voltage; a primary side control circuit, which is coupled to the power switch circuit, for generating the operation signal according to a target control signal; an opto-coupler circuit, which is coupled to the secondary winding, for generating the target control signal according to the programmable output voltage and a programming signal; and a secondary side control circuit, which is coupled to the opto-coupler circuit and the secondary winding, for generating the programming signal according to the programmable output voltage and a setting signal; wherein the primary side control circuit determines whether an over voltage condition occurs according to a rate of increase of the feedback signal and a control level of the target control signal, or according to the rate of increase of the feedback signal and a rate of change of the target control signal, and the primary side control circuit generates an over voltage protection signal when the over voltage condition occurs.

In one preferable embodiment, the determination that the primary side control circuit determines whether an over voltage condition occurs according to the rate of increase of the feedback signal and the control level of the target control signal, includes: determining whether the rate of increase of the feedback signal exceeds a predetermined rate of increase, and whether the control level of the target control signal exceeds a predetermined control level.

In one preferable embodiment, the determination that the primary side control circuit determines whether an over voltage condition occurs according to the rate of increase of the feedback signal and the rate of change of the target control signal, includes: determining whether the rate of increase of the feedback signal exceeds a predetermined rate of increase, and whether the rate of change of the target control signal is not negative.

In one preferable embodiment, the determination that the primary side control circuit determines whether an over voltage condition occurs according to the rate of increase of the feedback signal and the control level of the target control signal, includes: determining whether a time period wherein the feedback signal increases from a first level by a predetermined level difference is shorter than a predetermine time period, wherein the first level is related to a level of the feedback signal as the target control signal exceeds a predetermined control level.

In one preferable embodiment, the determination that the primary side control circuit determines whether an over voltage condition occurs according to the rate of increase of the feedback signal and the control level of the target control signal, includes: determining whether a level difference of the feedback signal is higher than a predetermined level difference within a predetermined time period starting from when the control level of the target control signal exceeds a predetermined control level, to determine whether the rate of increase of the feedback signal exceeds a predetermined rate of increase.

In one preferable embodiment, the determination that the primary side control circuit determines whether an over voltage condition occurs according to the rate of increase of the feedback signal and the control level of the target control signal, includes: determining whether the feedback signal exceeds a second level within a predetermined time period starting from when the control level of the target control signal exceeds a predetermined control level.

In one preferable embodiment, the secondary side control circuit includes: a comparison circuit, for generating a comparison signal according to the programmable output voltage and the setting signal; and an adjustment circuit, which is coupled to the comparison circuit, for generating the programming signal according to the comparison signal.

In the aforementioned embodiment, the secondary side control circuit preferably further includes a digital-to-analog converter (DAC) circuit, which is coupled to the comparison circuit, for converting the setting signal in a digital form to a reference voltage in an analog form, wherein the reference voltage is inputted to the comparison circuit.

In one preferable embodiment, the determination that the primary side control circuit determines whether an over voltage condition occurs according to the rate of increase of the feedback signal and the control level of the target control signal, includes: determining whether the rate of increase of the feedback signal exceeds a predetermined rate of increase, wherein the predetermined rate of increase is higher than a starting rate of increase, wherein the starting rate of increase is related to a rate of increase of the feedback signal in a start-up period of the flyback power supply circuit.

From another perspective, the present invention provides a control method of a flyback power supply circuit with a programmable function, comprising: receiving an input voltage; operating a power switch according to an operation signal, to converting an input voltage to a programmable output voltage; generating a feedback signal according to the programmable output voltage; generating the operation signal according to a target control signal; generating the target control signal according to the programmable output voltage and a programming signal; generating the programming signal according to the programmable output voltage and a setting signal; and determining whether an over voltage condition occurs according to a rate of increase of the feedback signal and a control level of the target control signal, or according to the rate of increase of the feedback signal and a rate of change of the target control signal, and generating an over voltage protection signal when the over voltage condition occurs.

In one preferable embodiment, the step of determining whether the over voltage condition occurs according to the rate of increase of the feedback signal and the control level of the target control signal, includes: determining whether the rate of increase of the feedback signal exceeds a predetermined rate of increase; and determining whether the control level of the target control signal exceeds a predetermined control level.

In one preferable embodiment, the step of determining whether the over voltage condition occurs according to the rate of increase of the feedback signal and the rate of change of the target control signal, includes: determining whether the rate of increase of the feedback signal exceeds a predetermined rate of increase; and determining whether the rate of change of the target control signal is not negative.

In one preferable embodiment, the step of determining whether the over voltage condition occurs according to the rate of increase of the feedback signal and the control level of the target control signal, includes: determining whether a time period wherein the feedback signal increases from a first level by a predetermined level difference is shorter than a predetermine time period, wherein the first level is related to a level of the feedback signal as the target control signal exceeds a predetermined control level.

In one preferable embodiment, the step of determining whether the over voltage condition occurs according to the rate of increase of the feedback signal, includes: determining whether a level difference of the feedback signal is higher than a predetermined level difference within a predetermined time period starting from when the control level of the target control signal exceeds a predetermined control level, to determine whether the rate of increase of the feedback signal exceeds a predetermined rate of increase.

In one preferable embodiment, the step of determining whether the over voltage condition occurs according to the rate of increase of the feedback signal and the control level of the target control signal, includes: determining whether the feedback signal exceeds a second level within a predetermined time period starting from when the control level of the target control signal exceeds a predetermined control level.

In one preferable embodiment, the step of determining whether the over voltage condition occurs according to the rate of increase of the feedback signal and the control level of the target control signal, includes: determining whether the rate of increase of the feedback signal exceeds a predetermined rate of increase, wherein the predetermined rate of increase is higher than a starting rate of increase, wherein the starting rate of increase is related to a rate of increase of the feedback signal in a start-up period of the flyback power supply circuit.

From another perspective, the present invention provides a flyback power supply circuit with a programmable function, comprising: a transformer circuit, which includes: a primary winding, for receiving an input voltage; and a secondary winding, for generating a programmable output voltage at an output node; a power switch circuit, which is coupled to the primary winding, for operating a power switch therein according to an operation signal, so as to convert the input voltage to the programmable output voltage; a primary side control circuit, which is coupled to the power switch circuit, for generating the operation signal according to a target control signal; an opto-coupler circuit, which is coupled to the secondary winding, for generating the target control signal according to the programmable output voltage and a programming signal; and a secondary side control circuit, which is coupled to the opto-coupler circuit and the secondary winding, for generating the programming signal according to the programmable output voltage and a setting signal, and for determining whether to control the opto-coupler circuit to set the target control signal to a maximum level according to a fault signal; wherein when the target control signal is not set to the maximum level, the secondary control circuit controls the opto-coupler circuit to maintain the target control signal not to exceed a predetermined control level, wherein the predetermined control level is lower than the maximum level; and wherein when the target control signal is set to the maximum level, the primary side control circuit determines that an over voltage condition occurs and generates an over voltage protection signal.

In one preferable embodiment, the secondary side control circuit includes: a comparison circuit, for generating a comparison signal according to the programmable output voltage and the setting signal; an adjustment circuit, which is coupled to the comparison circuit, for generating the programming signal according to the comparison signal; an upper limit control circuit, which is coupled to the adjustment circuit, for controlling the opto-coupler circuit to maintain the target control signal not to exceed the predetermined control level when the target control signal is not set to the maximum level; and an over voltage protection (OVP) trigger circuit, which is coupled to the adjustment circuit and the upper limit control circuit, for determining whether to control the opto-coupler circuit to set the target control signal to the maximum level according to the fault signal In one preferable embodiment, the transformer circuit further includes a tertiary winding, which is coupled to the secondary winding, for generating a feedback signal related to the programmable output voltage, wherein the primary side control circuit determines whether the over voltage condition occurs according to the feedback signal.

In the aforementioned embodiment, the secondary side control circuit preferably further includes a digital-to-analog converter (DAC) circuit, which is coupled to the comparison circuit, for converting the setting signal in a digital form to a reference voltage in an analog form, wherein the reference voltage is inputted to the comparison circuit.

From another perspective, the present invention provides a control method of a flyback power supply circuit with a programmable function, comprising: receiving an input voltage; operating a power switch according to an operation signal, so as to convert the input voltage to a programmable output voltage; generating the operation signal according to a target control signal; generating the target control signal according to the programmable output voltage and a programming signal; generating the programming signal according to the programmable output voltage and a setting signal, and determining whether to set the target control signal to a maximum level according to a fault signal; when the target control signal is not set to the maximum level, the target control signal is maintained not to exceed a predetermined control level, wherein the predetermined control level is lower than the maximum level; and when the target control signal is set to the maximum level, determining that an over voltage condition occurs, and generating an over voltage protection signal.

In one preferable embodiment, the step of generating the programming signal according to the programmable output voltage and the setting signal, and determining whether to set the target control signal to the maximum level according to the fault signal, includes: generating a comparison signal according to the programmable output voltage and the setting signal; generating the programming signal according to the comparison signal; controlling the target control signal not to exceed the predetermined control level when the target control signal is not set to the maximum level; and determining whether to set the target control signal to the maximum level according to the fault signal.

In the aforementioned embodiment, the control method preferably further comprises: generating a feedback signal according to the programmable output voltage; and determining whether the over voltage condition occurs according to the feedback signal.

The objectives, technical details, features, and effects of the present invention will be better understood with regard to the detailed description of the embodiments below.

DESCRIPTION OF THE PREFERRED EMBODIMENTS

Figure 1A:
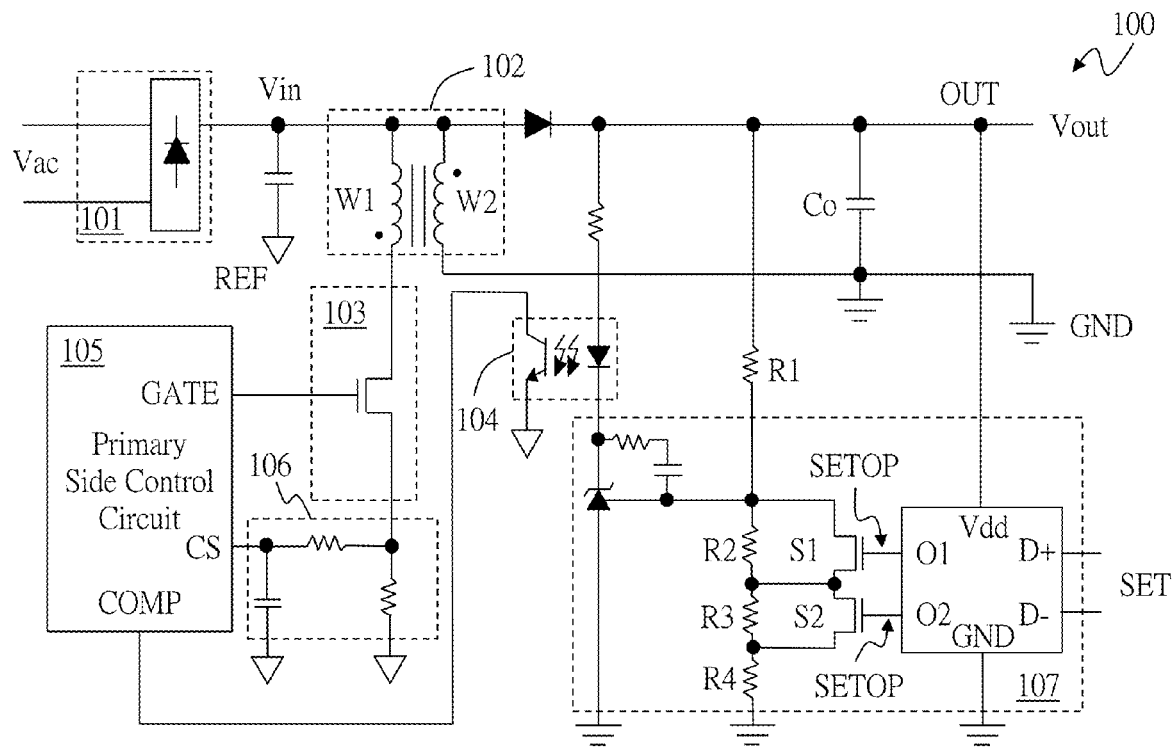
FIGS. 1A and 1B show schematic diagrams of a conventional programmable flyback power supply circuit 100 and signal waveforms thereof, respectively.
Figure 1B:
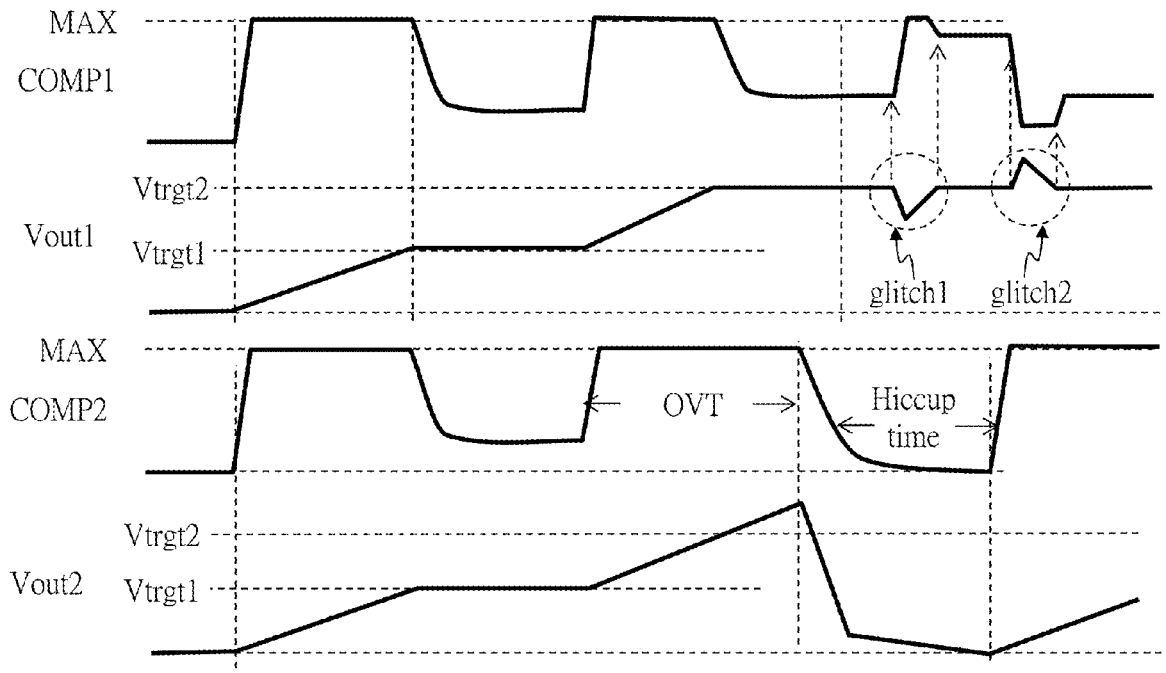
Figure 2:
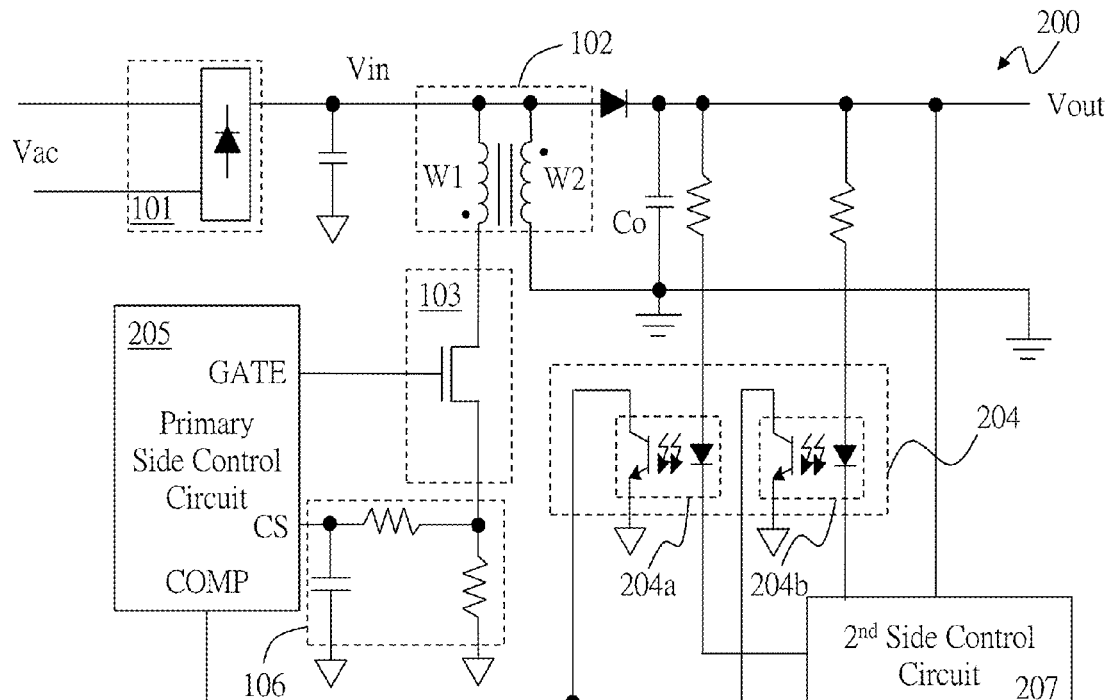
FIG. 2 shows another prior art programmable flyback power supply circuit 200.
Figure 3:
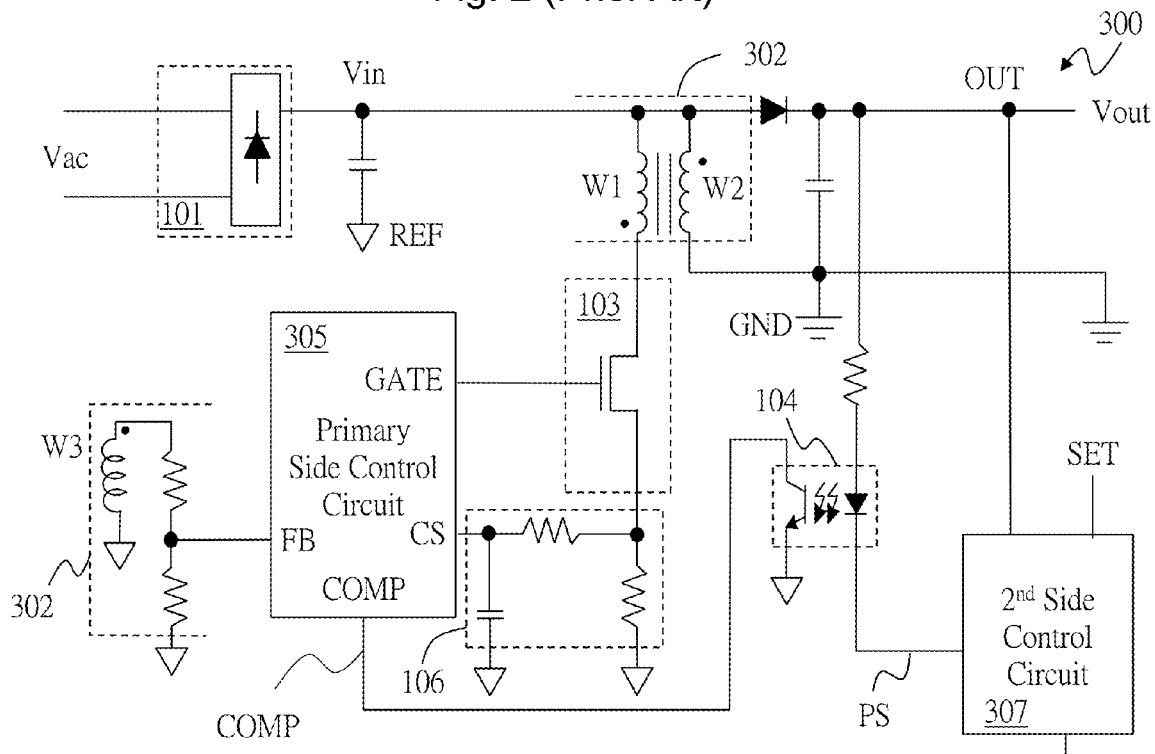
FIG. 3 shows a first embodiment of the present invention.

Please refer to FIG. 3 for a first embodiment according to the present invention. As shown in FIG. 3, a programmable flyback power supply circuit 300 includes a transformer circuit 302, a power switch circuit 103, a primary side control circuit 305, a current sense circuit 106, a opto-coupler circuit 104, and a secondary side control circuit 307. As shown in FIG. 3, the rectifier circuit 101 rectifies the AC voltage Vac to generate the input voltage Vin. The rectifier circuit 101 is for example a bridge rectifier circuit. A transformer circuit 302 of the flyback power supply circuit 300 receives the input voltage Vin, and converts it to the programmable output voltage Vout. The transformer circuit 302 includes a primary winding W1, a secondary winding W2, and a tertiary winding W3. The primary winding W1 receives the input voltage Vin. The secondary winding W2 is used for generating the programmable output voltage Vout at the output node OUT. The tertiary winding W3 is used for generating a feedback signal FB according to the programmable output voltage Vout.

The power switch circuit 103 is coupled to the primary winding W1, for operating a power switch therein according to the operation signal GATE, so as to convert the input voltage Vin to the programmable output voltage Vout. The primary side control circuit 305 is coupled to the power switch circuit 103, for generating the operation signal GATE according to a target control signal COMP, a current sense signal CS, and the feedback signal FB. The secondary winding W2 is electrically connected to the ground level GND, and the primary winding W1 and the tertiary winding W3 are electrically connected to the reference level REF. The current sense circuit 106 generates the current sense signal CS according to a power switch current flowing through the power switch circuit 103. The secondary side control circuit 307 generates a programming signal PS according to a setting signal SET and the programmable output voltage Vout, to adjust the target control signal COMP for regulating the programmable output voltage Vout or for changing a target level of the output voltage Vout.

The opto-coupler circuit 104 is coupled to the secondary winding W2, for generating the target control signal COMP according to the programmable output voltage and the programming signal PS. The secondary side control circuit 307 is coupled to the opto-coupler circuit 104 and the secondary winding W2, for generating the programming signal PS according to the programmable output voltage Vout and the setting signal SET. The primary side control circuit 305 determines whether an over voltage condition occurs according to a rate of increase of the feedback signal FB and a control level of the target control signal COMP, or according to the rate of increase of the feedback signal FB and a rate of change of the target control signal COMP. The primary side control circuit generates an over voltage protection signal when the over voltage condition occurs, wherein the protection signal for example can be used to turn OFF the power switch. The details as to how the primary side control circuit 305 determines whether an over voltage condition occurs according to a rate of increase of the feedback signal FB and a control level of the target control signal COMP, or according to the rate of increase of the feedback signal FB and a rate of change of the target control signal COMP, will be described later.

Figure 4A:
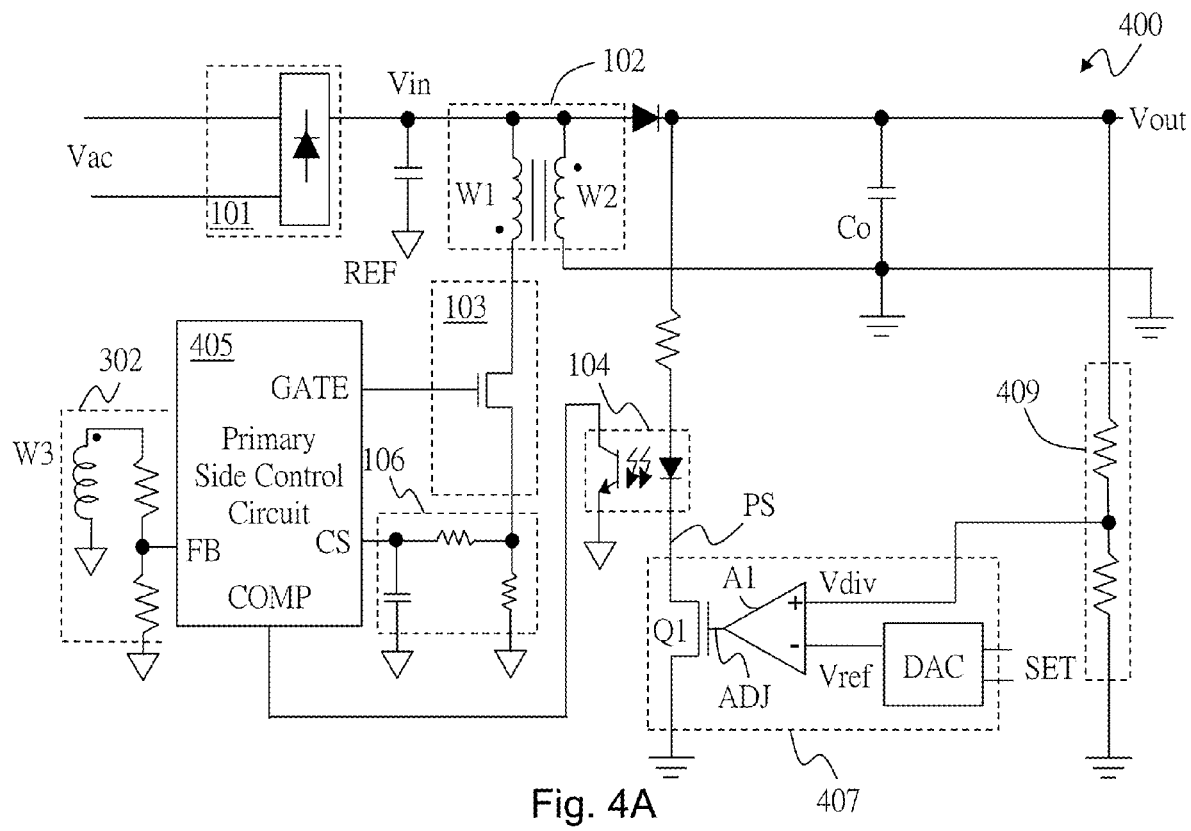
FIGS. 4A-4G show a second embodiment of the present invention.

Please refer to FIGS. 4A-4G for a second embodiment according to the present invention. This embodiment shows a more specific embodiment of a secondary side control circuit 407. As shown in FIG. 4A, the secondary side control circuit 407 includes a comparison circuit A1, an adjustment circuit Q1, and a digital-to-analog converter (DAC) circuit. The DAC circuit is coupled to the comparison circuit A1, for converting the setting signal SET in a digital form to a reference voltage Vref in an analog form, wherein the reference voltage Vref is inputted to the comparison circuit A1. The comparison circuit A1 generates a comparison signal ADJ according to the programmable output voltage Vout and the setting signal SET. The adjustment circuit Q1 is coupled to the comparison circuit A1, for generating a programming signal PS according to the comparison signal ADJ.

More specifically, the setting signal SET is determined by a user's setting or a requirement from a load circuit (not shown, the load circuit operating by receiving the programmable output voltage Vout, as well known by those skilled in the art, so details thereof are omitted here). In this embodiment, the setting signal SET is for example a single order or a multi-order digital signal. If the setting signal SET is single order, the setting signal SET remains constant before the programmable output voltage Vout is stabilized at a predetermined target level, and if the setting signal SET is multi-order, the setting signal SET changes (increases or decreases) with time before the programmable output voltage Vout is stabilized at the predetermined target level. The DAC circuit receives the setting signal SET, and converts it to the reference voltage Vref in the analog form. Referring to the signal waveform of the reference voltage Vref in FIG. 4B, the reference voltage Vref is first set to a level Vref1 which corresponds to setting the regulation target of the programmable output voltage Vout to the level Vtrgt1, and next set to a level Vref2 which corresponds to setting the regulation target of the programmable output voltage Vout to the level Vtrgt2; in this embodiment, the setting signal SET is a multi-order signal, so the setting signal SET increases, whereby the reference voltage Vref increases from the level Vref1 to a level Vref2 with a predetermined rate, and correspondingly, the programmable output voltage Vout increases from the level Vtrgt1 to the level Vtrgt2 with a predetermined rate of increase. As shown in FIG. 4A, the comparison circuit A1 compares a divided voltage Vdiv with the reference voltage Vref to generate the comparison signal ADJ. The divided voltage Vdiv is a divided voltage of the programmable output voltage Vout obtained by a voltage division circuit 409. The adjustment circuit Q1 includes for example but not limited to a transistor device as shown in the figure, which receives the comparison signal ADJ to determine the programming signal PS. The opto-coupler circuit 104 converts the programming signal PS to the target control signal COMP. Therefore, as shown in FIG. 4B, in the period wherein the reference voltage Vref changes from the level Vref1 to the level Vref2, the target control signal COMP increases with a rate of change.

Figure 4B:
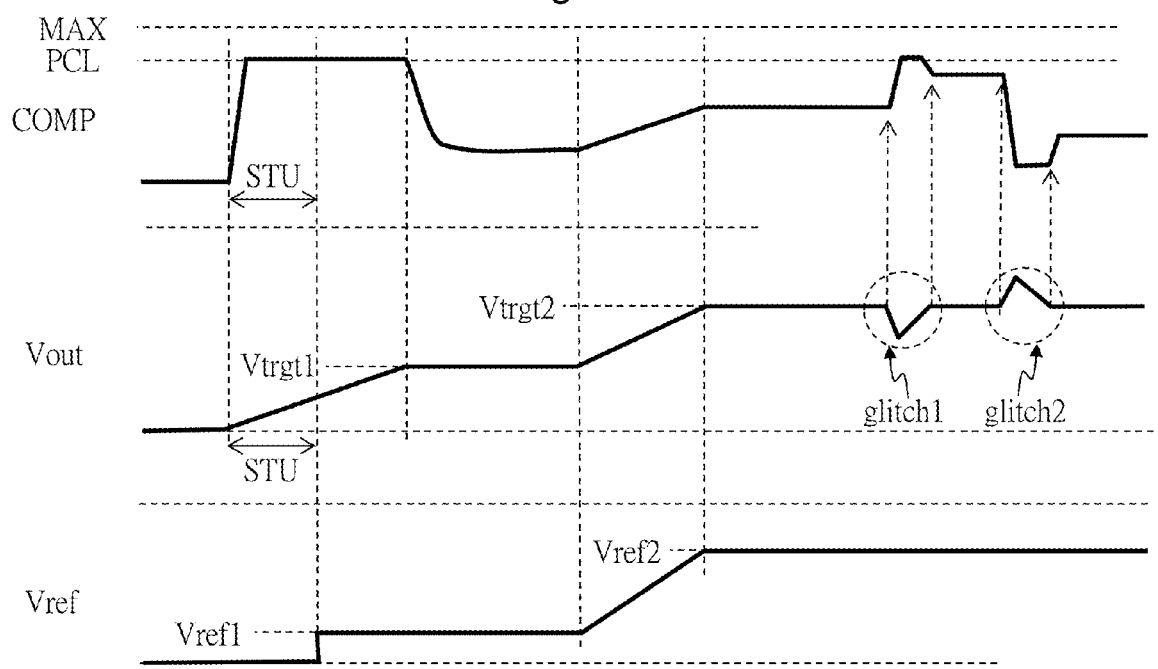

FIG. 4B shows a schematic diagram of the signal waveforms of the target control signal COMP, the programmable output voltage Vout, and the reference voltage Vref in a normal operation. First, a flyback power supply circuit 400 sets the level of the target control signal COMP to a predetermined control level PCL at a start-up period STU, whereby the programmable output voltage Vout increases. The predetermined control level PCL is for example slightly lower than the maximum level MAX. Next, after the start-up period STU, the reference voltage Vref is set to the level Vref1. In this embodiment, the setting signal SET is for example a single order digital signal setting the reference voltage Vref to the level Vref1, indicating that the regulation target of the programmable output voltage Vout is set to the level Vtrgt1. The programmable output voltage Vout keeps increasing by setting the target control signal COMP to the predetermined control level PCL. When the programmable output voltage Vout achieves the level Vtrgt1, the control level of the target control signal COMP starts to decrease, and the programmable output voltage Vout is regulated at the level Vtrgt1 by feedback control.

Next, in this embodiment, the level Vref1 of the reference voltage Vref is gradually increased to a level Vref2 by a multi-order digital setting signal SET. The gradually increased reference voltage Vref indicates that the regulation target of the programmable output voltage Vout is gradually adjusted from the level Vtrgt1 to the level Vtrgt2, while the target control signal COMP is also gradually increased. When the level of the programmable output voltage Vout achieves the level Vtrgt2, the programmable output voltage Vout is regulated at the level Vtrgt2 by feedback control through the target control signal COMP and the current sense signal CS. When there is a sudden drop of the programmable output voltage Vout for any reason such as a sudden heavy loading requirement, as shown by "glitch1" in the figure, the target control signal COMP will be set to the predetermined level PCL again, to increase the level of the programmable output voltage Vout to the level Vtrgt2 by feedback control. On the other hand, when there is a sudden increase of the programmable output voltage Vout1, as shown by "glitch2" in the figure, the target control signal COMP will be decreased, to decrease the level of the programmable output voltage Vout to the level Vtrgt2 by feedback control.

Figure 4C:
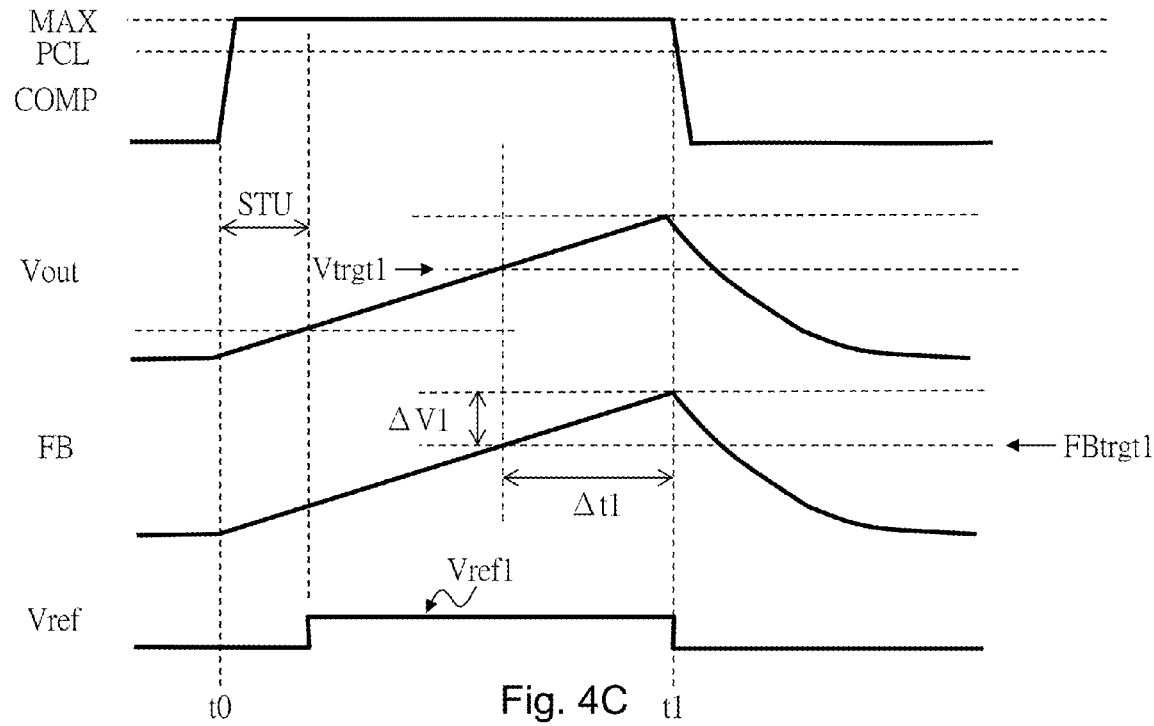

When an over voltage condition occurs, for example due to a damaged opto-coupler circuit 104 forming an open circuit, the control level of the target control signal COMP will be maintained at the maximum level MAX, and the level of the programmable output voltage Vout will keep increasing. The feedback signal FB is related to (for example, proportional to) the programmable output voltage Vout. In this embodiment, the primary side control circuit 405 can determine whether an over voltage condition occurs according to a rate of increase of the feedback signal FB and the control level of the target control signal COMP, or according to the rate of increase of the feedback signal FB and a rate of change of the target control signal COMP, and when an over voltage condition occurs, the primary side control circuit 405 can generate an over voltage protection signal, for example to turn OFF the power switch. That the primary side control circuit 405 determines whether an over voltage condition occurs according to the rate of increase of the feedback signal FB and the control level of the target control signal, or according to the rate of increase of the feedback signal FB and the rate of change of the target control signal COMP, for example can be achieved by one or more of the following approaches:

(1) The primary side control circuit 405 determines whether the rate of increase of the feedback signal FB exceeds a predetermined rate of increase, and whether the control level of the target control signal COMP exceeds the predetermined control level PCL. For example, as shown in FIG. 4C, an over voltage condition occurs at a time point t0. When the setting signal SET instructs to regulate the programmable output voltage Vout at the level Vtrgt1, but the level of the feedback signal FB exceeds a level FBtrgt1 which corresponds to the level Vtrgt1 of the programmable output voltage Vout, the primary side control circuit 405 starts counting a time period $\Delta t1$, and measures a level difference $\Delta V1$ which is an increase of the feedback signal FB during the time period $\Delta t1$. A rate of increase of the feedback signal FB is calculated according to $\Delta V1$ and $\Delta t1$, and the primary side control circuit 405 determines whether the rate of increase of the feedback signal FB exceeds the predetermined rate of increase. If the rate of increase of the feedback signal FB exceeds the predetermined rate of increase, and the control level of the target control signal COMP exceeds the predetermined control level PCL (for example, the control level of the target control signal COMP is maintained at the maximum level MAX), the primary side control circuit 405 determines that an over voltage condition occurs and generates the over voltage protection signal to turn OFF the power switch. As shown in FIG. 4C, by the aforementioned approach, an over voltage protection (OVP) mechanism is triggered at a time point t1, whereby the control level of the target control signal COMP is reduced, and the reference voltage Vref is also reduced. The aforementioned approach is to set a time period $\Delta t1$ and measure a level difference $\Delta V1$ which occurs in this time period $\Delta t1$. Certainly, it is equivalent to set a level difference (such as $\Delta V1$) and measure a time from when the level of the feedback signal FB starts exceeding the level FBtrgt1 to when the level difference reaches $\Delta V1$.

Figure 4D:
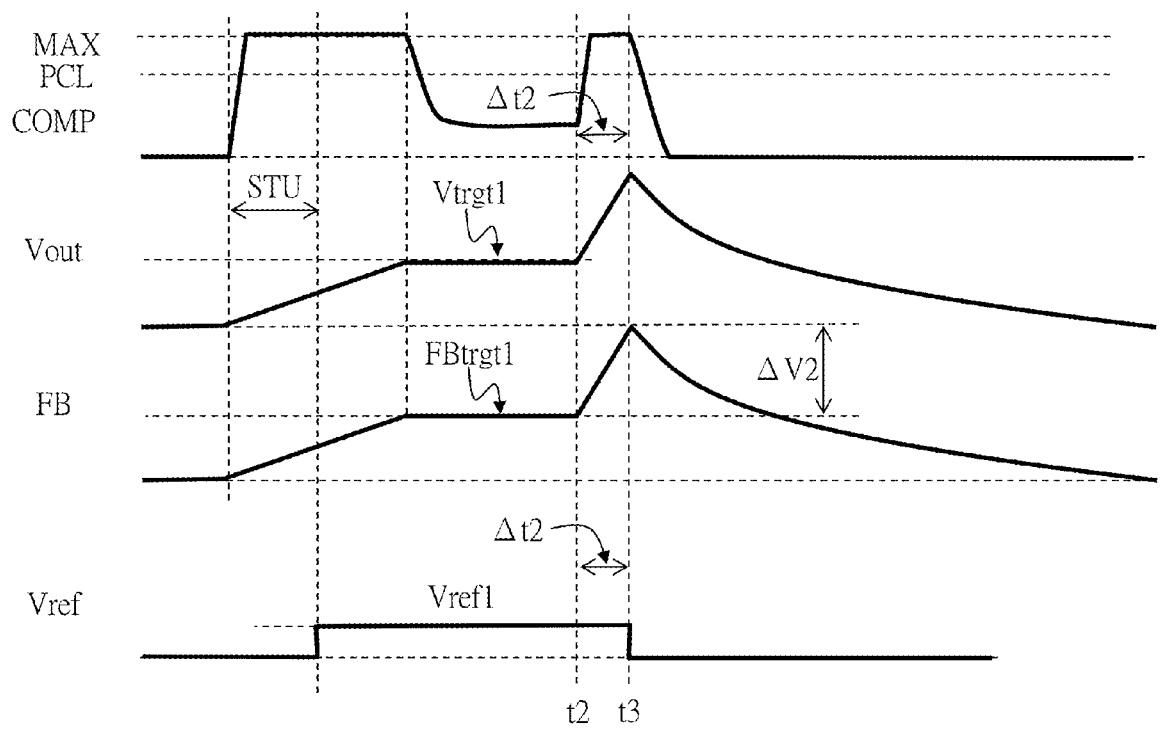

(2) The primary side control circuit 405 determines whether the rate of increase of the feedback signal FB exceeds the predetermined rate of increase, and whether the rate of change (slope) of the target control signal COMP is not negative. For example, as shown in FIG. 4D, an over voltage condition occurs at a time point t2, when the programmable output voltage Vout has been regulated at the level Vtrgt1 for a period of time. The level FBtrgt1 of the feedback signal FB corresponds to the level Vtrgt1 of the programmable output voltage Vout. When the setting signal SET instructs to regulate the programmable output voltage Vout at the level Vtrgt1, but the level of the feedback signal FB exceeds the level FBtrgt1, the primary side control circuit 405 starts counting a time period $\Delta t2$, and measures a level difference $\Delta V2$ which is an increase of the feedback signal FB during the time period $\Delta t2$. A rate of increase of the feedback signal FB is calculated according to $\Delta V2$ and $\Delta t2$, and the primary side control circuit 405 determines whether the rate of increase of the feedback signal FB exceeds the predetermined rate of increase. If the rate of increase of the feedback signal FB exceeds the predetermined rate of increase, and the rate of change (slope) of the target control signal COMP is not negative (for example, the control level of the target control signal COMP is increased from a relatively lower level to the maximum level MAX in the time period $\Delta t2$), the primary side control circuit 405 determines that an over voltage condition occurs and generates the over voltage protection signal to turn OFF the power switch. As shown in FIG. 4D, by the aforementioned approach, an over voltage protection (OVP) mechanism is triggered at a time point t3, whereby the control level of the target control signal COMP is reduced, and the reference voltage Vref is also reduced. The aforementioned approach is to set a time period $\Delta t2$ and measure a level difference $\Delta V2$ which occurs in this time period $\Delta t2$. Certainly, it is equivalent to set a level difference (such as $\Delta V2$) and measure a time from when the level of the feedback signal FB starts exceeding the level FBtrgt1 to when the level difference reaches $\Delta V2$.

Figure 4E:
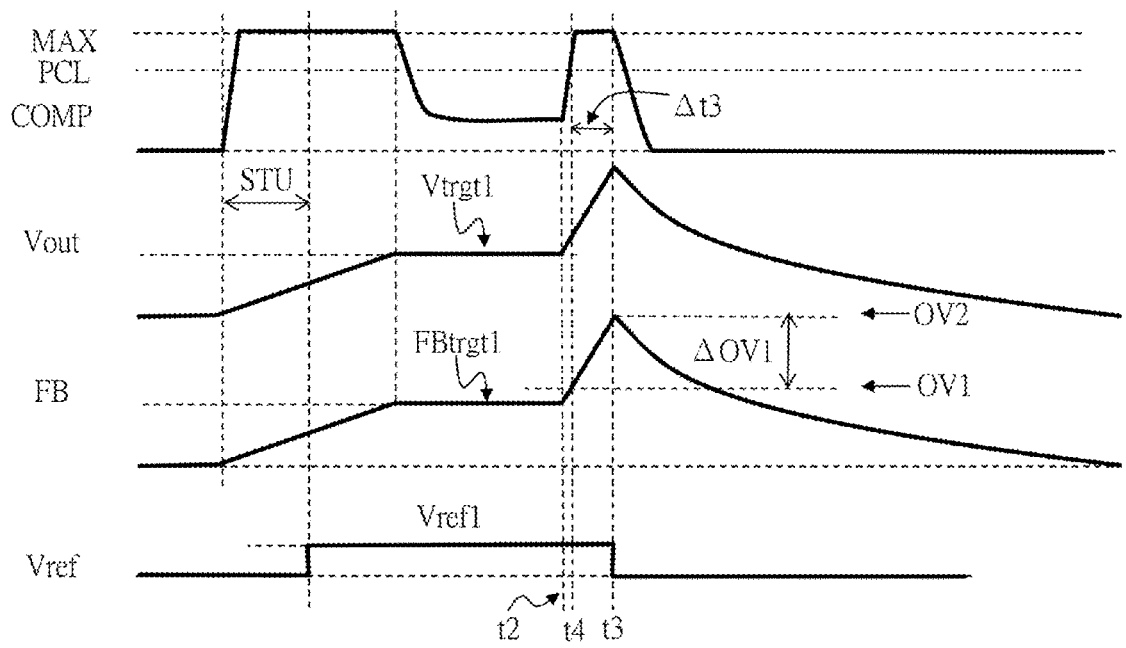

(3) The primary side control circuit 405 determines whether a time period $\Delta t3$ wherein the feedback signal FB increases from a level OV1 by a predetermined level difference $\Delta OV1$ is shorter than a predetermine time period, wherein the level OV1 is related to a level of the feedback signal FB as the target control signal COMP exceeds the predetermined control level PCL. For example, as shown in FIG. 4E, an over voltage condition occurs at a time point t2, when the programmable output voltage Vout has been regulated at the level Vtrgt1 for a period of time. The feedback signal FB increases from the level OV1 and reaches the level OV2 (the difference between OV2 and OV1 is the predetermined level difference $\Delta OV1$) by the time period $\Delta t3$. When the time period $\Delta t3$ is shorter than the predetermine time period, the primary side control circuit 405 determines that the rate of increase of the feedback signal FB exceeds the predetermined rate of increase. The level OV1 for example is a level of the feedback signal FB when the target control signal COMP exceeds the predetermined control level PCL (at time point t4). As shown in FIG. 4E, by the aforementioned approach, an over voltage protection (OVP) mechanism is triggered at a time point t3, whereby the control level of the target control signal COMP is reduced, and the reference voltage Vref is also reduced.

Figure 4F:
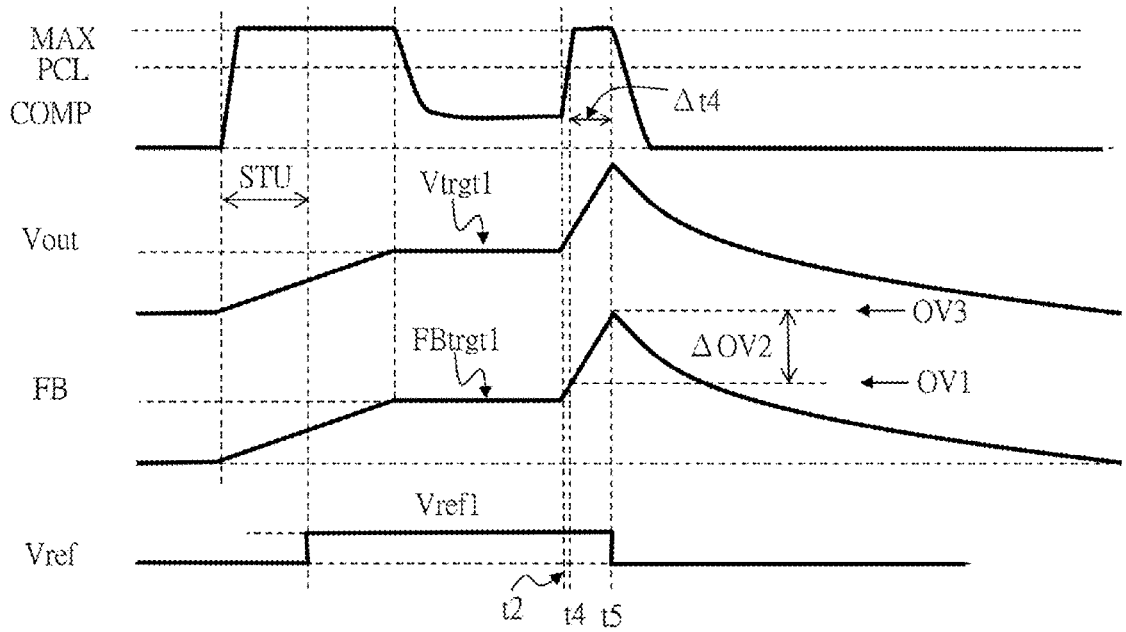

(4) The primary side control circuit 405 determines whether a level difference $\Delta OV2$ of the feedback signal FB is higher than a predetermined level difference within a predetermined time period $\Delta t4$, to determine whether the rate of increase of the feedback signal FB exceeds a predetermined rate of increase, wherein the predetermined time period $\Delta t4$ starts when the control level of the target control signal COMP exceeds the predetermined control level PCL. For example, as shown in FIG. 4F, an over voltage condition occurs at a time point t5, when the programmable output voltage Vout has been regulated at the level Vtrgt1 for a period of time. When the feedback signal FB increases from the level OV1 and reaches the level OV3 (the difference between OV3 and OV1 is the predetermined level difference $\Delta OV2$) within the time period $\Delta t4$, and the level difference $\Delta OV2$ is higher than the predetermined level difference, the primary side control circuit 405 determines that the rate of increase of the feedback signal FB exceeds the predetermined rate of increase. The level OV1 for example is a level of the feedback signal FB when the target control signal COMP exceeds the predetermined control level PCL (at time point t4). As shown in FIG. 4F, by the aforementioned approach, an over voltage protection (OVP) mechanism is triggered at a time point t5, whereby the control level of the target control signal COMP is reduced, and the reference voltage Vref is also reduced.

Figure 4G:
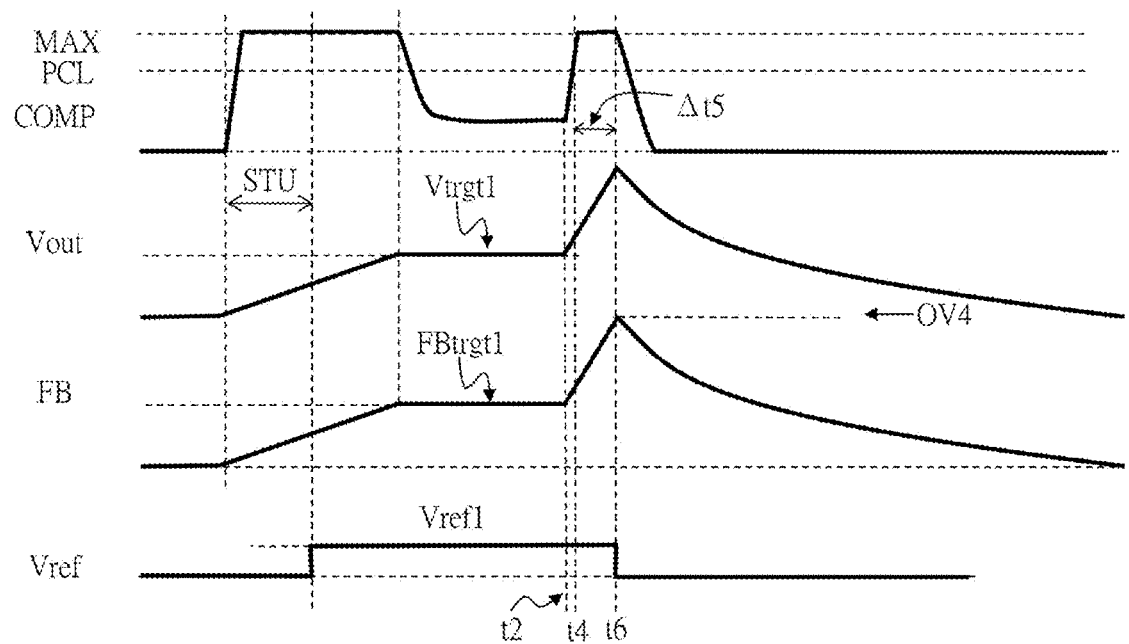

(5) The primary side control circuit 405 determines whether the feedback signal FB exceeds a level OV4 within a predetermined time period $\Delta t5$ as the control level of the target control signal COMP exceeds the predetermined control level PCL. For example, as shown in FIG. 4G, an over voltage condition occurs at a time point t2, when the programmable output voltage Vout has been regulated at the level Vtrgt1 for a period of time. After the control level of the target control signal COMP exceeds the predetermined control level PCL at the time point t4, within the predetermined time period $\Delta t5$ as shown in FIG. 4G, the feedback signal FB exceeds the level OV4. Hence, the primary side control circuit 405 determines that the rate of increase of the feedback signal FB exceeds the predetermined rate of increase. As shown in FIG. 4G, by the aforementioned approach, an over voltage protection (OVP) mechanism is triggered at a time point t6, whereby the control level of the target control signal COMP is reduced, and the reference voltage Vref is also reduced.

Figure 5A:
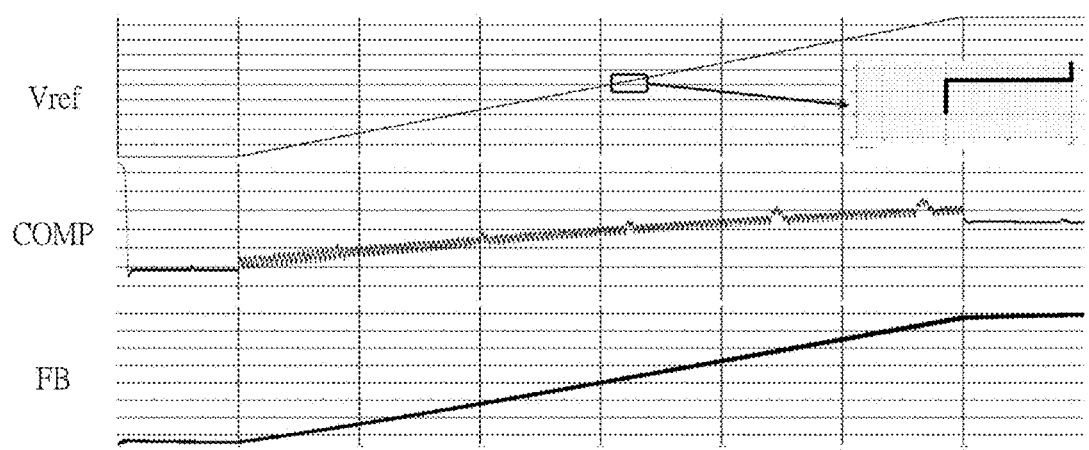
FIGS. 5A and 5B show schematic diagrams of signal waveforms of reference voltages Vref, target control signals COMP, and feedback signals FB with different starting rate of increase in a start-up period.
Figure 5B:
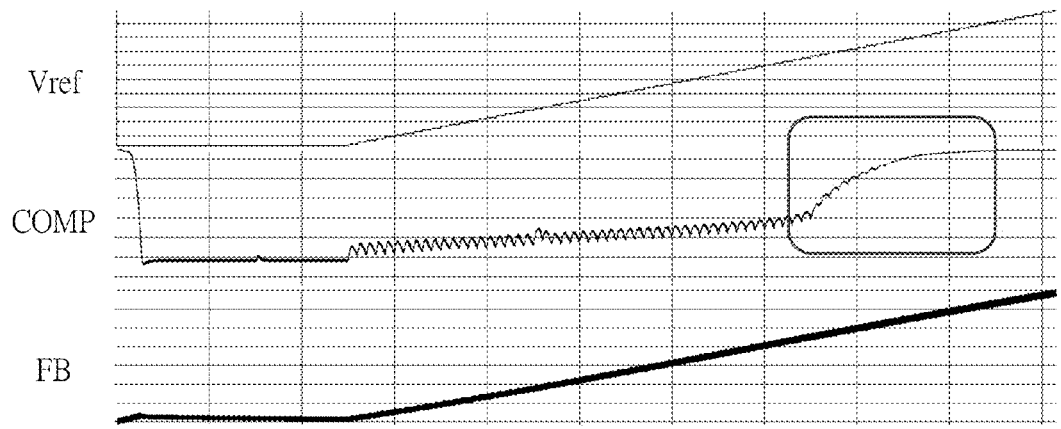

According to the present invention, for example in the second embodiment, the approach that the primary side control circuit 405 determines whether an over voltage condition occurs according to the rate of increase of the feedback signal FB and the control level of the target control signal COMP, may include: determining whether the rate of increase of the feedback signal FB exceeds a predetermined rate of increase, wherein the predetermined rate of increase is higher than a starting rate of increase, wherein the starting rate of increase is related to a rate of increase of the feedback signal FB in a start-up period of the flyback power supply circuit 400. FIGS. 5A and 5B show schematic diagrams of the reference voltage Vref, the target control signal COMP, and the feedback signal FB in the start-up period with different starting rates of increase of the feedback signal FB. FIG. 5A shows that the predetermined rate of increase is higher than the starting rate of increase of the feedback signal FB, and thus an over voltage protection mechanism is not triggered in the start-up period. FIG. 5B shows that the starting rate of increase of the feedback signal FB is higher than the predetermined rate of increase, and thus an over voltage protection mechanism is triggered in the start-up period.

Referring to FIG. 5A, the condition is that, in a full load condition, the programmable output voltage Vout increases form 5V to 20V in 30 mini-seconds (ms), wherein an output capacitor Co has a capacitance 2000 micro-Faraday (μF), an output current is 3.3 Amps (A), and an over current protection (OCP) setting is 120%. FIG. 5A shows the schematic diagram of the signal waveforms of the reference voltage Vref, the target control signal COMP, and the feedback signal FB in the start-up period. The signal waveform of the reference voltage Vref shown in the figure increases gradually from a relatively lower level to a relatively higher level (which is set by a multi-order setting signal SET), wherein a small figure in FIG. 5A shows a schematic diagram indicating that the reference voltage Vref changes step-wise in response to the multi-order setting signal SET.

Referring to FIG. 5A, the condition is that, in a full load condition, the programmable output voltage Vout increases form 5V to 20V in 30 ms, wherein an output capacitor Co has a capacitance 3000 μF, an output current is 3.3A, and an over current protection (OCP) setting is 120%. FIG. 5B shows the schematic diagram of the signal waveforms of the reference voltage Vref, the target control signal COMP, and the feedback signal FB in the start-up period. In this case, an over voltage protection mechanism is triggered.

Figure 6A:
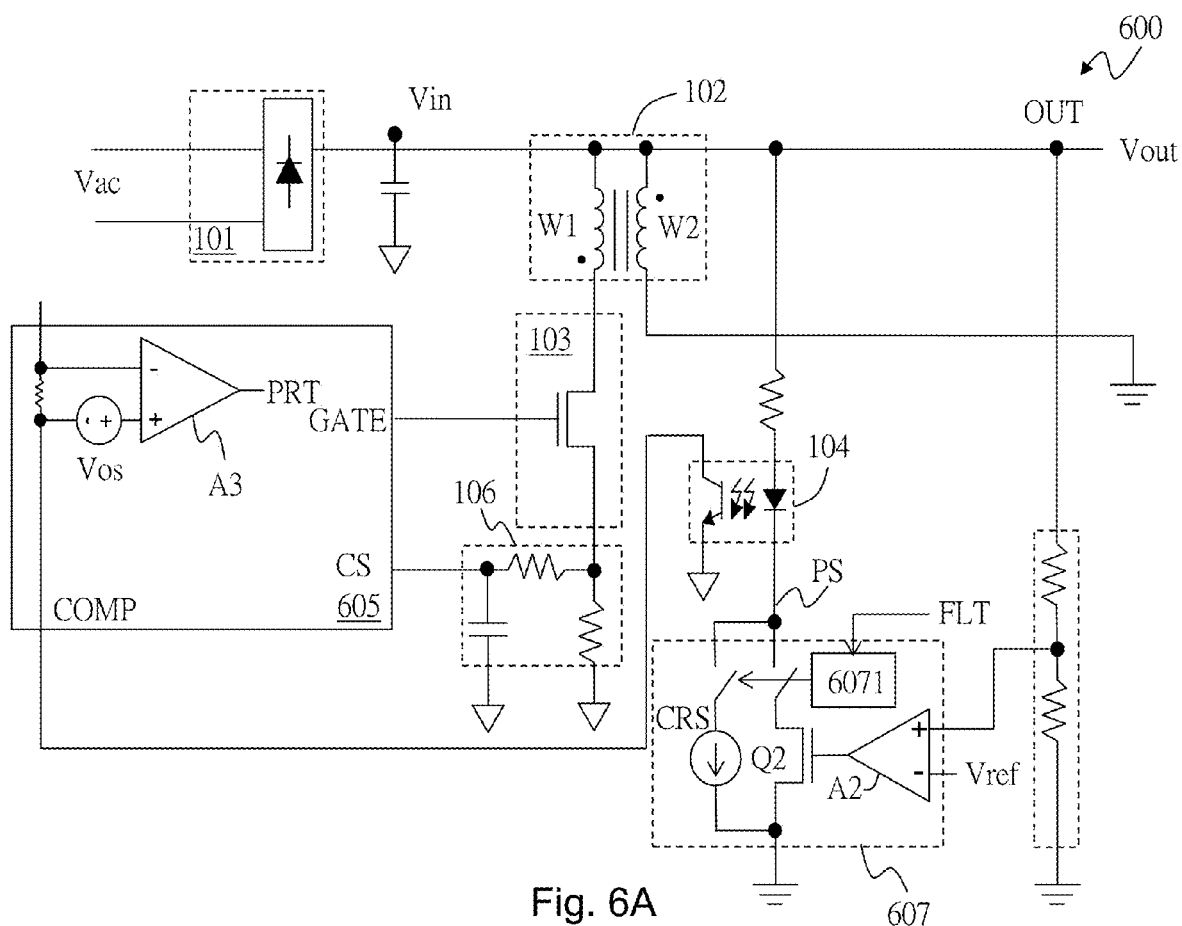
FIGS. 6A-6D show a third embodiment of the present invention.

FIGS. 6A-6D show a third embodiment of the present invention. As shown in FIG. 6A, a programmable flyback power supply circuit 600 includes a transformer circuit 102, a power switch circuit 103, a primary side control circuit 605, a current sense circuit 106, an opto-coupler circuit 104, and a secondary side control circuit 607. As shown in FIG. 6A, the rectifier circuit 101 rectifies the AC voltage Vac to generate the input voltage Vin. The rectifier circuit 101 is for example the bridge rectifier circuit. A transformer circuit 102 of the flyback power supply circuit 600 receives the input voltage Vin, and converts it to the programmable output voltage Vout. The transformer circuit 102 includes a primary winding W1 and a secondary winding W2. The primary winding W1 is used for receiving the input voltage V1. The secondary winding W2 is used for generating the programmable output voltage Vout at the output node OUT.

The power switch circuit 103 is coupled to the primary winding W1, for operating the power switch therein according to the operation signal GATE, so as to convert the input voltage Vin to the programmable output voltage Vout. The primary side control circuit 605 is coupled to the power switch circuit 103, for generating the operation signal GATE according to the target control signal COMP and a current sense signal CS. The secondary winding W2 is electrically connected to the ground level GND, and the primary winding W1 is electrically connected to the reference level REF. The current sense circuit 106 generates the current sense signal CS according to a power switch current flowing through the power switch circuit 103. The secondary side control circuit 607 adjusts the target control signal COMP according to a setting signal SET and the programmable output voltage Vout, to generate a programming signal PS for regulating the programmable output voltage Vout or for changing a target level of the output voltage Vout.

The opto-coupler circuit 104 is coupled to the secondary winding W2, for generating the target control signal COMP according to the programmable output voltage Vout and the programming signal PS. The secondary side control circuit 607 is coupled to the opto-coupler circuit 104 and the secondary winding W2, for generating the programming signal PS according to the programmable output voltage Vout and the setting signal SET, wherein the setting signal SET is for example but not limited to the reference voltage Vref. In this embodiment, the secondary side control circuit 607 further determines whether to control the opto-coupler circuit 104 to set the target control signal COMP to the maximum level MAX according to a fault signal FLT. When the target control signal COMP is not set to the maximum level MAX, the secondary control circuit 607 controls the opto-coupler circuit 104 to maintain the target control signal COMP not to exceed a predetermined control level PCL, wherein the predetermined control level PCL is lower than the maximum level MAX. When the target control signal COMP is set to the maximum level MAX, the primary side control circuit 605 determines that an over voltage condition occurs, and generate an over voltage protection signal in response, to turn OFF the power switch.

As shown in FIG. 6A, the secondary side control circuit 607 includes: a comparison circuit A3, an adjustment circuit Q2, an upper limit control circuit CRS, and an OVP trigger circuit 6071. The comparison circuit A2 generates a comparison signal according to the programmable output voltage Vout and the setting signal, wherein the setting signal is for example but not limited to the reference voltage Vref as shown in the figure. The adjustment circuit Q2 is coupled to the comparison circuit A2, for generating the programming signal PS according to the comparison signal. The upper limit control circuit CRS is coupled to the adjustment circuit Q2, for controlling the opto-coupler circuit 104 to maintain the target control signal COMP not to exceed the predetermined control level PCL when the target control signal COMP is not set to the maximum level MAX. When the target control signal COMP is set to the maximum level MAX, the primary side control circuit 605 determines that an over voltage condition occurs, and generate an over voltage protection signal in response, to turn OFF the power switch. The OVP trigger circuit 6071 is coupled to the adjustment circuit Q2 and the upper limit control circuit CRS, for determining whether to control the opto-coupler circuit 104 to set the target control signal COMP to the maximum level MAX according to the fault signal FLT.

In one embodiment, the transformer circuit 102 in the programmable flyback power supply circuit 600 may further include a tertiary winding W3, which is coupled to the secondary winding W2, for generating the feedback signal FB according to the programmable output voltage Vout, whereby the primary side control circuit 605 can determine whether an over voltage condition occurs according to the feedback signal FB. The tertiary winding W3 is not shown in FIG. 6A, but is shown in the aforementioned first and second embodiments.

In one embodiment, the secondary side control circuit 607 of the secondary side control circuit 600 may further include a digital-to-analog converter (DAC) circuit, which is coupled to the comparison circuit A2, for converting a digital setting signal to the reference voltage Vref in an analog form, to be inputted to the comparison circuit A2. The DAC circuit is not shown in FIG. 6A, but is shown in the aforementioned second embodiment.

Still referring FIG. 6A, when the target control signal COMP is set to the maximum level MAX, for example, the primary control circuit 605 includes a comparison circuit A3 and a bias circuit Vos, for generating an over voltage protection signal PRT according to the target control signal COMP, to turn OFF the power switch.

Figure 6B:
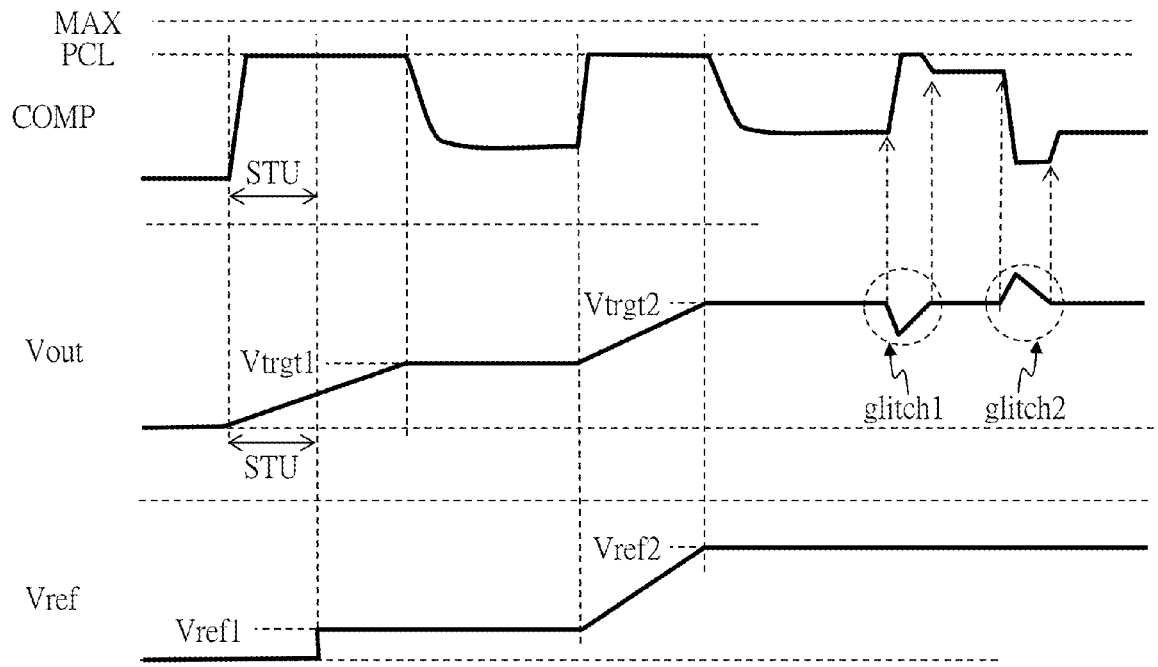

FIG. 6B shows a schematic diagram of the signal waveforms of the target control signal COMP, the programmable output voltage Vout, and the reference voltage Vref in a normal operation. First, a flyback power supply circuit 600 sets the control level of the target control signal COMP to a predetermined control level PCL at a start-up period STU, whereby the programmable output voltage Vout increases. The predetermined control level PCL is for example slightly lower than the maximum level MAX. Next, after the start-up period STU, the reference voltage Vref is set to the level Vref1. In this embodiment, the setting signal SET is for example a single order digital signal setting the reference voltage Vref to the level Vref1, indicating that the regulation target of the programmable output voltage Vout is set to the level Vtrgt1. The programmable output voltage Vout keeps increasing by setting the target control signal COMP to the predetermined control level PCL. When the programmable output voltage Vout achieves the level Vtrgt1, the control level of the target control signal COMP starts to decrease, and the programmable output voltage Vout is regulated at the level Vtrgt1 by feedback control.

Next, in this embodiment, the level Vref1 of the reference voltage Vref is gradually increased to a level Vref2 by a multi-order digital setting signal SET. The gradually increased reference voltage Vref indicates that the regulation target of the programmable output voltage Vout is gradually adjusted from the level Vtrgt1 to the level Vtrgt2, while the target control signal COMP is also gradually increased. When the level of the programmable output voltage Vout achieves the level Vtrgt2, the programmable output voltage Vout is regulated at the level Vtrgt2 by feedback control through the target control signal COMP and the current sense signal CS. When there is a sudden drop of the programmable output voltage Vout for any reason such as a sudden heavy loading requirement, as shown by "glitch1" in the figure, the target control signal COMP will be set to the predetermined level PCL again, to increase the level of the programmable output voltage Vout to the level Vtrgt2 by feedback control. On the other hand, when there is a sudden increase of the programmable output voltage Vout1, as shown by "glitch2" in the figure, the target control signal COMP will be decreased, to decrease the level of the programmable output voltage Vout to the level Vtrgt2 by feedback control.

Figure 6C:
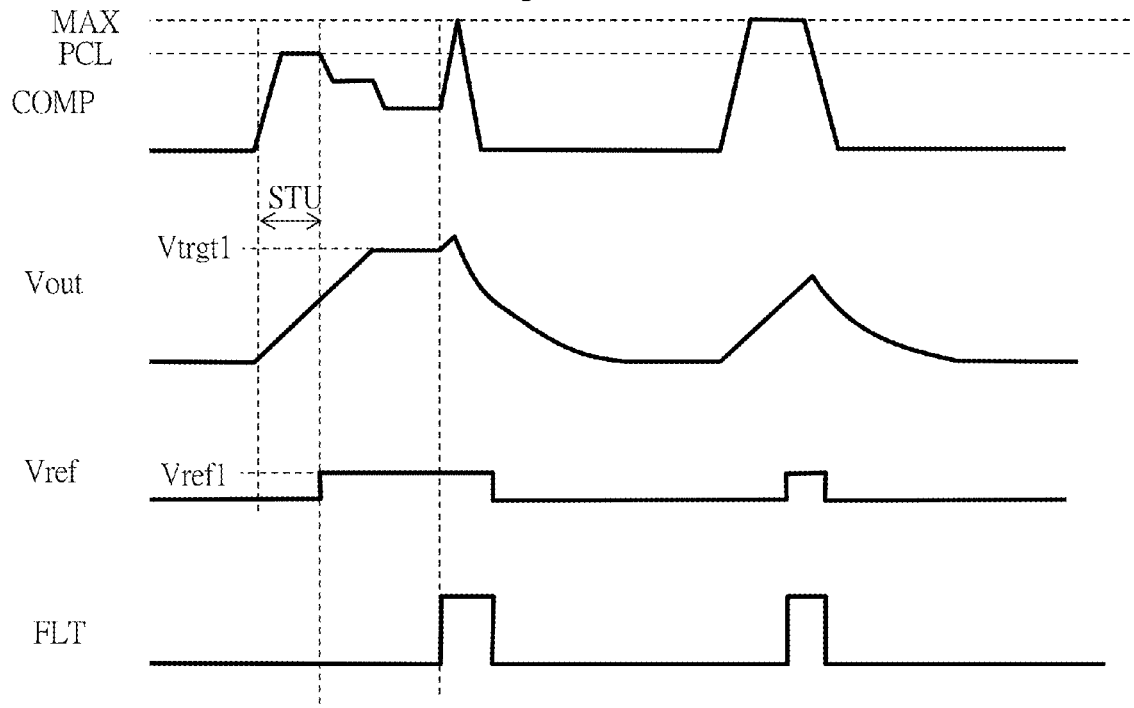

As shown in FIG. 6C, when the primary side control circuit 605 detects that the control level of the target control signal COMP exceeds the predetermined control level PCL at a time point t7, and that the programmable output voltage Vout exceeds the level Vtrgt1, it is determined that an over voltage condition occurs, and thus an OVP mechanism is triggered to reduce the control level of the target control signal COMP and the reference voltage Vref as well. Note that the OCP mechanism is triggered by the fault signal FLT in this case.

Figure 6D:
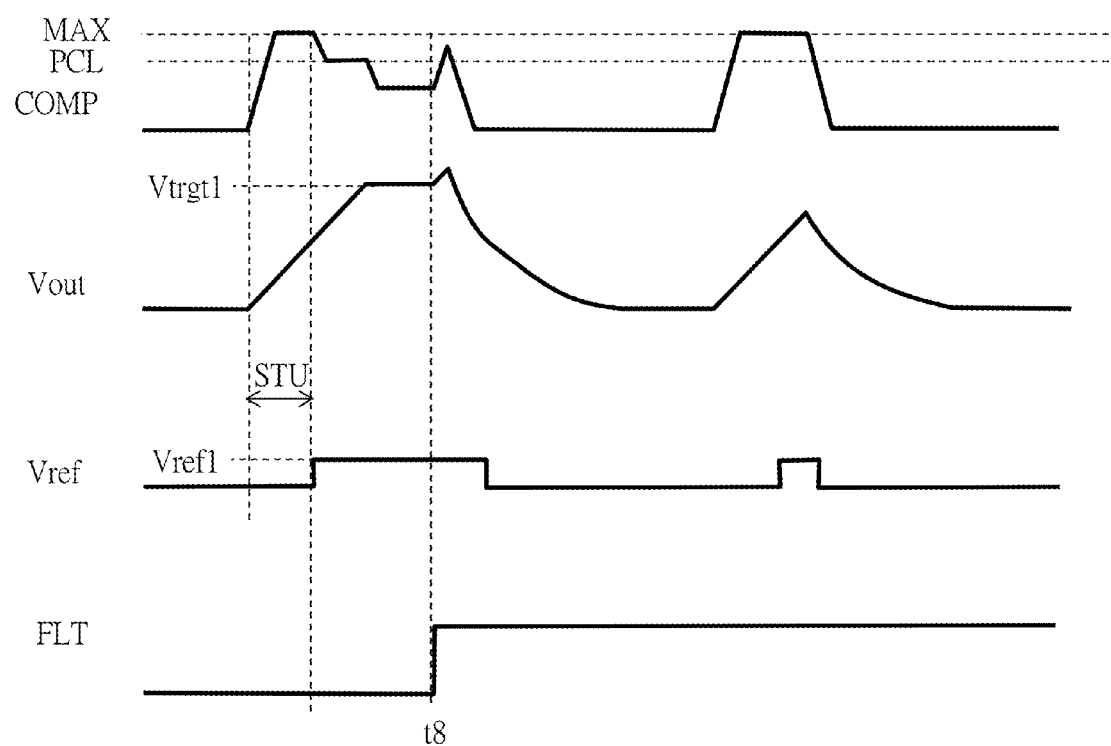

As shown in FIG. 6D, when the primary side control circuit 605 detects that the control level of the target control signal COMP exceeds the predetermined control level PCL at a time point t8, and that the programmable output voltage Vout exceeds the level Vtrgt1, it is determined that an over voltage condition occurs, and thus an OVP mechanism is triggered to reduce the control level of the target control signal COMP and the reference voltage Vref as well. Note that the OCP mechanism is triggered by a damaged opto-coupler device in the opto-coupler circuit 104 in this case.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits in the shown embodiments, so the term "couple" should include direct and indirect connections. For another example, the resistors or the voltage divider circuit is not limited to a circuit formed by passive devices, but it may be formed by other circuits, such as transistors. For another example, the programmable output voltage Vout is not limited to having only two different predetermined levels Vout1 and Vout2, but may have three or more different predetermined levels. In view of the foregoing, the spirit of the present invention should cover all such and other modifications and variations, which should be interpreted to fall within the scope of the following claims and their equivalents.

What is claimed is:

1. A flyback power supply circuit with a programmable function, comprising:
   a transformer circuit, which includes:
      a primary winding, for receiving an input voltage;
      a secondary winding, for generating a programmable output voltage at an output node; and
      a tertiary winding, for generating a feedback signal related to the programmable output voltage according to the programmable output voltage;
   a power switch circuit, which is coupled to the primary winding, for operating a power switch therein according to an operation signal, so as to convert the input voltage to the programmable output voltage;
   a primary side control circuit, which is coupled to the power switch circuit, for generating the operation signal according to a target control signal;
   an opto-coupler circuit, which is coupled to the secondary winding, for generating the target control signal according to the programmable output voltage and a programming signal; and
   a secondary side control circuit, which is coupled to the opto-coupler circuit and the secondary winding, for generating the programming signal according to the programmable output voltage and a setting signal;
   wherein the primary side control circuit determines whether an over voltage condition occurs according to a rate of increase of the feedback signal and a control level of the target control signal, or according to the rate of increase of the feedback signal and a rate of change of the target control signal, and the primary side control circuit generates an over voltage protection signal when the over voltage condition occurs.

2. The flyback power supply circuit of claim 1, wherein the determination that the primary side control circuit determines whether an over voltage condition occurs according to the rate of increase of the feedback signal and the control level of the target control signal, includes: determining whether the rate of increase of the feedback signal exceeds a predetermined rate of increase, and whether the control level of the target control signal exceeds a predetermined control level.

3. The flyback power supply circuit of claim 1, wherein the determination that the primary side control circuit determines whether an over voltage condition occurs according to the rate of increase of the feedback signal and the rate of change of the target control signal, includes: determining whether the rate of increase of the feedback signal exceeds a predetermined rate of increase, and whether the rate of change of the target control signal is not negative.

4. The flyback power supply circuit of claim 1, wherein the determination that the primary side control circuit determines whether an over voltage condition occurs according to the rate of increase of the feedback signal and the control level of the target control signal, includes: determining whether a time period wherein the feedback signal increases from a first level by a predetermined level difference is shorter than a predetermine time period, wherein the first level is related to a level of the feedback signal as the target control signal exceeds a predetermined control level.

5. The flyback power supply circuit of claim 1, wherein the determination that the primary side control circuit determines whether an over voltage condition occurs according to the rate of increase of the feedback signal and the control level of the target control signal, includes: determining whether a level difference of the feedback signal is higher than a predetermined level difference within a predetermined time period starting from when the control level of the target control signal exceeds a predetermined control level, to determine whether the rate of increase of the feedback signal exceeds a predetermined rate of increase.

6. The flyback power supply circuit of claim 1, wherein the determination that the primary side control circuit determines whether an over voltage condition occurs according to the rate of increase of the feedback signal and the control level of the target control signal, includes: determining whether the feedback signal exceeds a second level within a predetermined time period starting from when the control level of the target control signal exceeds a predetermined control level.

7. The flyback power supply circuit of claim 1, wherein the secondary side control circuit includes:
a comparison circuit, for generating a comparison signal according to the programmable output voltage and the setting signal; and
an adjustment circuit, which is coupled to the comparison circuit, for generating the programming signal according to the comparison signal.

8. The flyback power supply circuit of claim 7, wherein the secondary side control circuit further includes a digital-to-analog converter (DAC) circuit, which is coupled to the comparison circuit, for converting the setting signal in a digital form to a reference voltage in an analog form, wherein the reference voltage is inputted to the comparison circuit.

9. The flyback power supply circuit of claim 1, wherein the determination that the primary side control circuit determines whether an over voltage condition occurs according to the rate of increase of the feedback signal and the control level of the target control signal, includes: determining whether the rate of increase of the feedback signal exceeds a predetermined rate of increase, wherein the predetermined rate of increase is higher than a starting rate of increase, wherein the starting rate of increase is related to a rate of increase of the feedback signal in a start-up period of the flyback power supply circuit.

10. A control method of a flyback power supply circuit with a programmable function, comprising:
receiving an input voltage;
operating a power switch according to an operation signal, to converting an input voltage to a programmable output voltage;
generating a feedback signal according to the programmable output voltage;
generating the operation signal according to a target control signal;
generating the target control signal according to the programmable output voltage and a programming signal;
generating the programming signal according to the programmable output voltage and a setting signal; and
determining whether an over voltage condition occurs according to a rate of increase of the feedback signal and a control level of the target control signal, or according to the rate of increase of the feedback signal and a rate of change of the target control signal, and generating an over voltage protection signal when the over voltage condition occurs.

11. The control method of claim 10, wherein the step of determining whether an over voltage condition occurs according to the rate of increase of the feedback signal and the control level of the target control signal, includes:
determining whether the rate of increase of the feedback signal exceeds a predetermined rate of increase; and
determining whether the control level of the target control signal exceeds a predetermined control level.

12. The control method of claim 10, wherein the step of determining whether an over voltage condition occurs according to the rate of increase of the feedback signal and the rate of change of the target control signal, includes:
determining whether the rate of increase of the feedback signal exceeds a predetermined rate of increase; and
determining whether the rate of change of the target control signal is not negative.

13. The control method of claim 10, wherein the step of determining whether an over voltage condition occurs according to the rate of increase of the feedback signal and the control level of the target control signal, includes: determining whether a time period wherein the feedback signal increases from a first level by a predetermined level difference is shorter than a predetermine time period, wherein the first level is related to a level of the feedback signal as the target control signal exceeds a predetermined control level.

14. The control method of claim 10, wherein the step of determining whether an over voltage condition occurs according to the rate of increase of the feedback signal, includes: determining whether a level difference of the feedback signal is higher than a predetermined level difference within a predetermined time period starting from when the control level of the target control signal exceeds a predetermined control level, to determine whether the rate of increase of the feedback signal exceeds a predetermined rate of increase.

15. The control method of claim 10, wherein the step of determining whether an over voltage condition occurs according to the rate of increase of the feedback signal and the control level of the target control signal, includes: determining whether the feedback signal exceeds a second level within a predetermined time period starting from when the control level of the target control signal exceeds a predetermined control level.

16. The control method of claim 10, wherein the step of determining whether an over voltage condition occurs according to the rate of increase of the feedback signal and the control level of the target control signal, includes: determining whether the rate of increase of the feedback signal exceeds a predetermined rate of increase, wherein the predetermined rate of increase is higher than a starting rate of increase, wherein the starting rate of increase is related to a rate of increase of the feedback signal in a start-up period of the flyback power supply circuit.

17. A flyback power supply circuit with a programmable function, comprising:
  a transformer circuit, which includes:
    a primary winding, for receiving an input voltage; and
    a secondary winding, for generating a programmable output voltage at an output node;
  a power switch circuit, which is coupled to the primary winding, for operating a power switch therein according to an operation signal, so as to convert the input voltage to the programmable output voltage;
  a primary side control circuit, which is coupled to the power switch circuit, for generating the operation signal according to a target control signal;
  an opto-coupler circuit, which is coupled to the secondary winding, for generating the target control signal according to the programmable output voltage and a programming signal; and
  a secondary side control circuit, which is coupled to the opto-coupler circuit and the secondary winding, for generating the programming signal according to the programmable output voltage and a setting signal, and for determining whether to control the opto-coupler circuit to set the target control signal to a maximum level according to a fault signal;
  wherein when the target control signal is not set to the maximum level, the secondary control circuit controls the opto-coupler circuit to maintain the target control signal not to exceed a predetermined control level, wherein the predetermined control level is lower than the maximum level; and
  wherein when the target control signal is set to the maximum level, the primary side control circuit determines that an over voltage condition occurs and generates an over voltage protection signal.

18. The flyback power supply circuit of claim 17, wherein the secondary side control circuit includes:
  a comparison circuit, for generating a comparison signal according to the programmable output voltage and the setting signal;
  an adjustment circuit, which is coupled to the comparison circuit, for generating the programming signal according to the comparison signal;
  an upper limit control circuit, which is coupled to the adjustment circuit, for controlling the opto-coupler circuit to maintain the target control signal not to exceed the predetermined control level when the target control signal is not set to the maximum level; and
  an over voltage protection (OVP) trigger circuit, which is coupled to the adjustment circuit and the upper limit control circuit, for determining whether to control the opto-coupler circuit to set the target control signal to the maximum level according to the fault signal.

19. The flyback power supply circuit of claim 17, wherein the transformer circuit further includes a tertiary winding, which is coupled to the secondary winding, for generating a feedback signal according to the programmable output voltage, wherein the primary side control circuit determines whether an over voltage condition occurs according to the feedback signal.

20. The flyback power supply circuit of claim 18, wherein the secondary side control circuit further includes a digital-to-analog converter (DAC) circuit, which is coupled to the comparison circuit, for converting the setting signal in a digital form to a reference voltage in an analog form, wherein the reference voltage is inputted to the comparison circuit.

21. A control method of a flyback power supply circuit with a programmable function, comprising:
  receiving an input voltage;
  operating a power switch according to an operation signal, so as to convert the input voltage to a programmable output voltage;
  generating the operation signal according to a target control signal;
  generating the target control signal according to the programmable output voltage and a programming signal;
  generating the programming signal according to the programmable output voltage and a setting signal, and determining whether to set the target control signal to a maximum level according to a fault signal;
  when the target control signal is not set to the maximum level, the target control signal is maintained not to exceed a predetermined control level, wherein the predetermined control level is lower than the maximum level; and
  when the target control signal is set to the maximum level, determining that an over voltage condition occurs, and generating an over voltage protection signal.

22. The control method of claim 21, wherein the step of generating the programming signal according to the programmable output voltage and the setting signal, and determining whether to set the target control signal to the maximum level according to the fault signal, includes:
  generating a comparison signal according to the programmable output voltage and the setting signal;
  generating the programming signal according to the comparison signal;
  controlling the target control signal not to exceed the predetermined control level when the target control signal is not set to the maximum level; and
  determining whether to set the target control signal to the maximum level according to the fault signal.

23. The control method of claim 21 further comprising:
  generating a feedback signal according to the programmable output voltage; and
  determining whether an over voltage condition occurs according to the feedback signal.

* * * * *